J. R. McGIFFERT.
VALVE.
APPLICATION FILED MAR. 22, 1911.

1,160,300.

Patented Nov. 16, 1915.

WITNESSES:

INVENTOR
John R. McGiffert
BY
J. B. Fay
ATTORNEY

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

VALVE.

1,160,300.  Specification of Letters Patent.  Patented Nov. 16, 1915.

Application filed March 22, 1911.  Serial No. 616,109.

*To all whom it may concern:*

Be it known that I, JOHN R. McGIFFERT, a citizen of the United States, and a resident of Duluth, county of St. Louis, and State of Minnesota, have invented a new and useful Improvement in Valves, of which the following is a specification, the principle of the invention being herein explained and the best mode in which I have contemplated applying that principle, so as to distinguish it from other inventions.

Fluid actuated clutches have lately come into more or less general use in connection with hoisting mechanism for the purpose of connecting the hoisting drums with the engine, such clutches being in the form of flexible bands adapted, when drawn together, to grip the cylindrical surface of the drum. For obvious reasons the fluid generally utilized for operating clutches of this type is steam, usually direct from the boiler and at a correspondingly high pressure. More or less trouble is encountered, however, in employing such relatively high pressure-fluid, on account of the quickness of its action, it being desirable that the load should be picked up gradually. Moreover, the operator is equally unable to properly regulate the tension of the clutch band so as to permit the drum to slip within it, as is sometimes desirable in order to allow the line wound upon the drum to pay out. In operating a clutch of this type by hand, the pressure of course can be easily and exactly regulated to secure any desired result, and the object of the present invention is the provision of a valve suitable for controlling the supply of steam, or equivalent pressure-fluid, in the case of a mechanism of the class described, or in other analogous situations, whereby the pressure passing through said valve may be readily regulated from no pressure at all up to the full pressure available.

To the accomplishment of this and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

Figure 1:
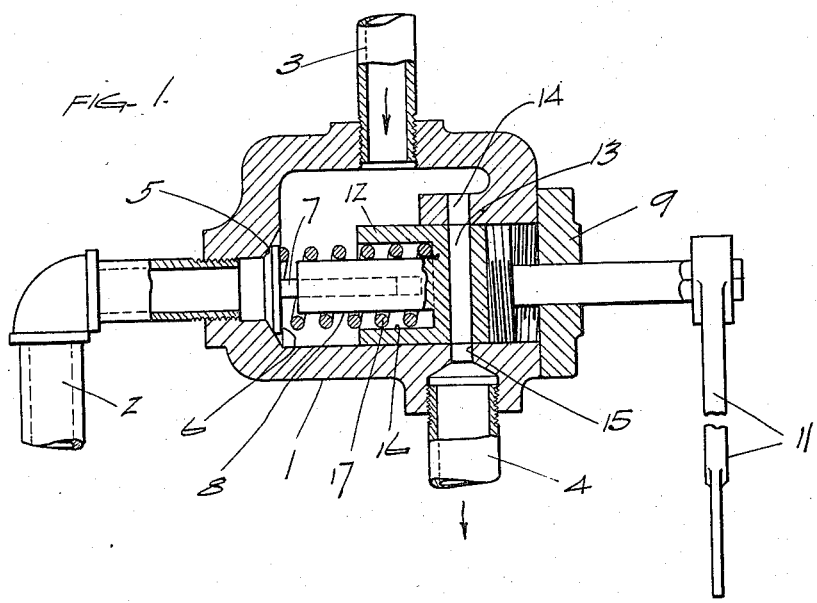
Figure 2:
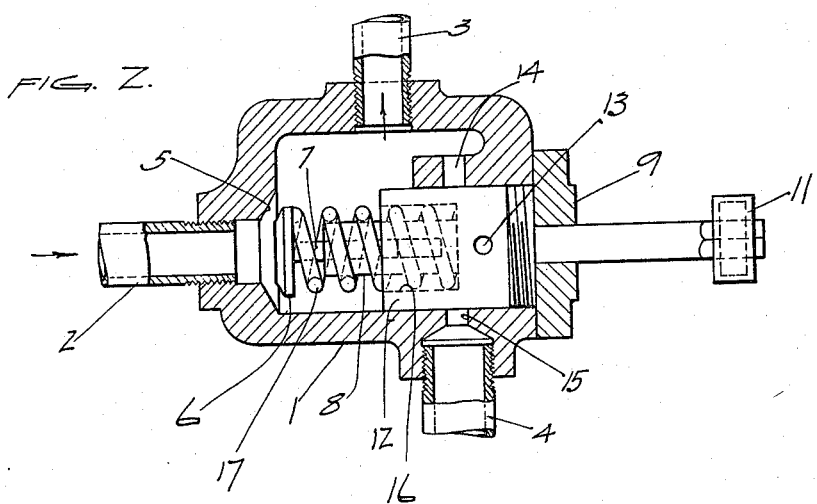

In said annexed drawing:—Figure 1 is a central sectional view of a valve embodying my present improvements; and Fig. 2 is a similar sectional view, but showing the parts in a different operative position.

It will be understood, of course, that in presenting above a certain field for the use of valves of the kind in hand, it is not intended to imply that such valve is necessarily limited to such single field. It is accordingly illustrated entirely apart from any of the accessory mechanism with which it would ordinarily be associated. It may be assumed, however, that where used to control the supply of steam or other pressure fluid to a cylinder or equivalent fluid-pressure engine, the pressure fluid will be supplied to the valve casing 1 through the inlet pipe 2; that thence it may pass to the cylinder through pipe 3; while in proper position of the valve mechanism, presently to be described, said casing and the engine connected therewith may exhaust through an exhaust pipe 4.

The bore or opening in the valve casing or body with which the supply pipe 2 is connected, is formed with a valve seat 5 against which a valve 6 of the puppet type is adapted to fit. The shank 7 of said valve is freely reciprocably held in a stem 8 that is threaded in the end of the valve body opposite to the inlet opening just referred to, such end consisting of a removable plate 9 to permit the assembling of the parts and their separation when occasion demands. To the outer end of the stem is attached a lever 11 for rotating said stem when it is desired to operate the valve. Intermediate between its ends, the stem is provided with a cylindrical enlargement 12 that is closely fitted in a corresponding bore in the adjacent portion of the valve body and is provided with a transverse passage 13 adapted to register with ports 14 and 15 in such body portion and by so registering to open communication between the interior of said body and the exhaust line. Upon rotation of the stem the passage in such enlargement is thrown out of register with the ports in question and the exhaust closed. Such enlargement is furthermore formed with an annular groove 16 at its forward end surrounding the stem proper, in which groove is received one end of a compression spring 17, the other end of which presses against the rear face of the valve 6.

Having thus described the construction of my improved valve, the manner of its operation may be briefly set forth.

In the inner position of the stem 8 illustrated in Fig. 1, not only is the transverse passage 13 in the enlarged portion of such stem disposed so as to permit any pressure within the valve body to be relieved, but the spring 17, carried by said stem and pressing against the valve 6, is placed under sufficient pressure to maintain the latter on its seat against whatever fluid pressure the device may be operating under. If now the lever be rotated so as to slightly retract the stem, the exhaust port 15 is immediately closed, even though the spring be still held under such tension as to retain the valve closed; but upon still further retraction, such spring tension will be relieved sufficiently to permit the valve to partially open, that is, it will open until such a pressure is built up within the valve casing and the engine cylinder, or other parts in communication therewith, as to equal, when added to the remaining tension of the spring, the pressure of the steam or other fluid in the supply pipe. For example, assuming the pressure of the steam thus supplied to be 100 lbs. to the square inch, and that the tension of the spring, when the stem is forced into its inner position, is sufficient to just balance such steam pressure; and assuming further that the stem has a longitudinal movement of 1¼ inch and that the spring will be entirely expanded upon movement of the stem away one inch from the position in which the valve is thus closed against the steam pressure; then it will be obvious that when the stem is fully withdrawn, as shown in Fig. 2, there will be an unrestricted opening of ¼ inch between the valve and its seat. If, however, the stem be moved away from its initial position, wherein the valve is held closed, only one-half inch, then one-half of the pressure of the spring will still be exerted against said valve and in this position of the valve it will be obvious that steam will only pass through the valve until the pressure beneath the valve or in the casing, is equal to 50 lbs. to the square inch, whereupon the spring will be effective to close the valve. By adjusting the stem to various intermediate positions, the pressure of the steam passing through the valve may be readily regulated from zero up to the full pressure of the boiler, this pressure being determined, of course, by the position of the lever which, in turn, positions the stem.

The valve it will be seen is in effect an adjustable reducing valve, and I have found it entirely satisfactory in use in avoiding the sudden jerk on the machinery heretofore referred to as being occasioned by the direct application of the full steam pressure to clutches of type under discussion. My improved valve also enables the operator to gradually release such clutch, should he desire to do this in order to slowly lower the load supported by the drum in the case of hoisting mechanism. In such case the clutch is in effect used as a brake and this mode of operating hoisting drums is frequently found very convenient in use, but is entirely unavailable in the prevailing type of construction of fluid-pressure clutch.

Other modes of applying the principle of my invention, may be employed instead of the one explained, change being made as regards the mechanism herein disclosed, provided the means stated by the following claim or the equivalent of such stated means be employed.

I therefore particularly point out and distinctly claim as my invention:—

In a device of the character described, the combination of a valve casing having an inlet opening, a discharge opening, and an exhaust opening; a rotatable stem threaded in said casing; a valve reciprocably mounted in said stem and adapted to control such inlet opening; a spring bearing against said valve and said stem and tending to seat said valve, and means adapted to rotate said stem, said stem having a free passage adapted in one rotative position to connect such exhaust opening with the interior of said casing, rotation of said stem being also adapted to move said stem longitudinally thereby varying the pressure exerted by said spring.

Signed by me this 13th day of March, 1911.

JOHN R. McGIFFERT.

Attested by—
M. W. LEPP,
J. J. LUMIER.